(12) United States Patent
Kalpakoff

(10) Patent No.: US 6,386,835 B1
(45) Date of Patent: May 14, 2002

(54) MISTING PUMP AND HOUSING SYSTEM

(75) Inventor: Jeffrey J. Kalpakoff, Phoenix, AZ (US)

(73) Assignee: Fogco Systems, Inc., Gilbert, AZ (US)

( * ) Notice: Subject to any disclaimer, the term of this patent is extended or adjusted under 35 U.S.C. 154(b) by 11 days.

(21) Appl. No.: 09/614,888

(22) Filed: Jul. 12, 2000

(51) Int. Cl.[7] .......................... F04B 39/00; F05B 1/28; F16K 23/00; B67D 1/16; B67D 5/06

(52) U.S. Cl. .................. 417/300; 417/423.12; 239/120; 239/268; 137/312; 222/111; 222/183; 222/333

(58) Field of Search ........................... 417/300, 423.12; 239/120, 268; 137/312; 222/333, 183, 111

(56) References Cited

U.S. PATENT DOCUMENTS

| | | | |
|---|---|---|---|
| 3,217,941 A | * 11/1965 | Fishburne | 222/333 |
| 3,320,895 A | * 5/1967 | Peterson et al. | 222/333 |
| 5,011,520 A | * 4/1991 | Carr et al. | 55/228 |
| 5,330,104 A | 7/1994 | Marcus | |
| 5,454,783 A | * 10/1995 | Grieshaber et al. | 604/30 |
| 5,555,907 A | * 9/1996 | Philipp | 137/312 |

* cited by examiner

Primary Examiner—Charles G. Freay
Assistant Examiner—Timothy P. Solak
(74) Attorney, Agent, or Firm—Jordan M. Meschkow; Lowell W. Gresham; Meschkow & Gresham, P.L.C.

(57) ABSTRACT

A misting pump system (20) includes a housing (22), an electronic section (62), and a water transfer section (80). The housing (22) includes a base (48), a front panel (24), a rear panel (26), a cover (50), and a barrier wall (52). The barrier wall (52) is coupled to a floor (66) of the base (48). The barrier wall (52) extends from the floor (66) to a roof (68) of the cover (50) to form a first compartment (76) and a second compartment (78). The water transfer section (80) is located in the first compartment (76) and the electronic section (62) is located in the second compartment. Openings (108, 118, 132, 140) in the barrier wall (52) provide an access between an inlet (89) and an outlet (91) of a pump (88) of the electronic section (62) to the water transfer section (80). The barrier wall (52) is configured to substantially prevent water issuing from a water leak in the water transfer section (80) from passing into the electronic section (62).

16 Claims, 4 Drawing Sheets

MISTING PUMP AND HOUSING SYSTEM

TECHNICAL FIELD OF THE INVENTION

The present invention relates to the field of misting systems for use in cooling outdoor areas in dry climates. More specifically, the present invention relates to a misting pump system for boosting water pressure of expelled mist.

BACKGROUND OF THE INVENTION

Misting systems have become very popular in dry climate areas in which the rapid evaporation of mist or moisture is capable of quickly and efficiently cooling outdoor areas, such as private and commercial patios, outdoor restaurants, livestock enclosures, and so forth. The relatively large size of these outdoor areas results in long spans of conduit and a plurality of misting nozzles coupled to the conduit for distributing the water in the form of fine misting spray streams. In order to achieve uniform misting spray streams, misting pumps have been utilized to increase the pressure of the water used in the misting system. That is, the pump boosts the pressure of the incoming water so that the pressurized water issuing from the misting pump is effectively distributed to the misting nozzles along the length of the conduit.

Safety and equipment dependability are usually of great concern when employing the use of electrically powered misting pump systems. A problem with one prior art misting system is that the electronic section, i.e., the motor and water pump, of the misting system is not effectively separated from the water transfer section, i.e., the inlet and outlet tubing, of the pump. Moreover, the inlet and outlet tubing are formed from pliable rubber hoses and compression fittings, which may leak and crack under normal use. Accordingly, if one of the water tubes or couplers of the water transfer section were to fail, water may leak into the pump housing and cause a short in the electrical section. A short may result in damage to the misting pump system. More significantly, a short may result in an electric shock to an individual who subsequently contacts the pump housing or the internal mechanisms of the misting pump system.

In addition, misting pump systems are often located in outdoor areas. As such, it is also important that the misting pump system be resistant to damage from precipitation. Rain leaking into a misting pump system could result in a short in the electrical system, again leading to equipment damage and/or injury to an individual.

It would be highly advantageous, therefore, to remedy the foregoing and other deficiencies and problems inherent in the prior art.

SUMMARY OF THE INVENTION

Accordingly, it is an advantage of the present invention that an improved misting pump system is provided.

It is another advantage of the present invention that a housing is provided that establishes a separation between an electronic section and a water transfer section of the misting pump system.

Yet another advantage of the present invention is that a housing is provided that is water resistant, rugged, and readily assembled.

The above and other advantages of the present invention are carried out in one form by a misting pump system that includes a motor and a water pump in communication with and controlled by the motor. A first tube is in fluid communication with an inlet of the water pump for delivering water to the water pump, the water exhibiting a first water pressure. A second tube is in fluid communication with an outlet of the water pump for receiving pressurized water from the water pump. The pressurized water exhibits a second water pressure that is greater than the first water pressure.

A housing of the misting pump system includes a base having a floor and a cover removably coupled to the base, the cover having a roof. A barrier wall is coupled to the floor of the base and extends from the floor to the roof to form first and second compartments within the housing. The first and second tubes are located in the first compartment and the motor and the water pump are located in the second compartment.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
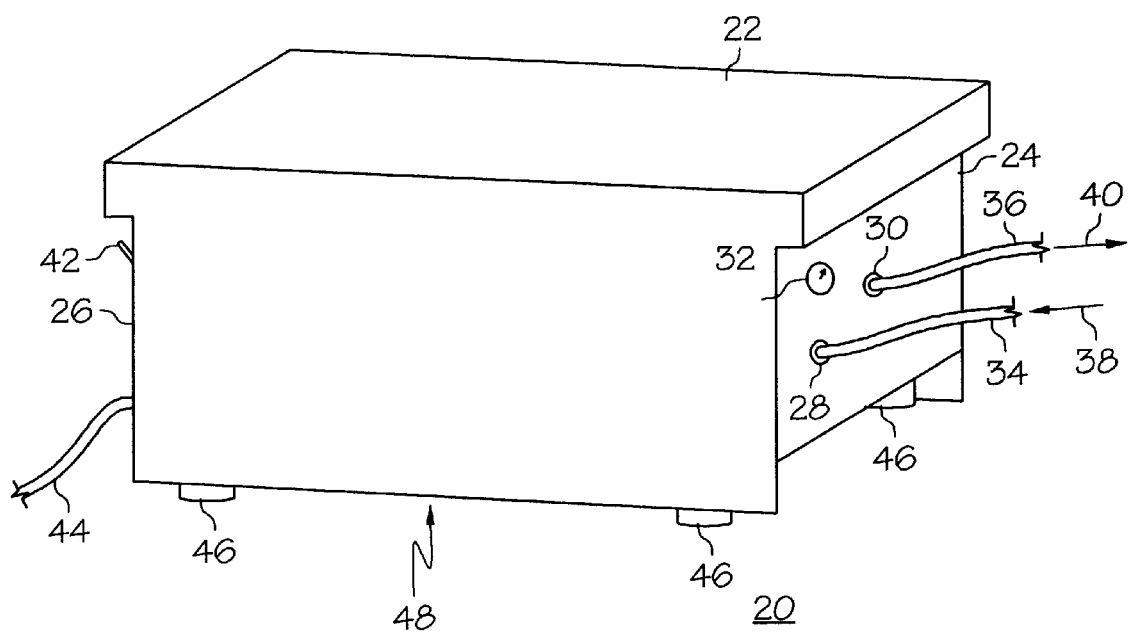
FIG. 1 shows a perspective view of a misting pump system in accordance with a preferred embodiment of the present invention.

FIG. 1 shows a perspective view of a misting pump system 20 in accordance with a preferred embodiment of the present invention. Generally, system 20 includes a housing 22 defined by a front panel 24 and a rear panel 26. An inlet port 28, an outlet port 30, and a pressure gauge 32 extend through front panel 24. Inlet port 28 is configured to mate with an input hose 34 whose distal end (not shown) is connected to a water source (not shown). Outlet port 30 is configured to mate with an output hose 36 whose distal end (not shown) is connected to a conduit (not shown) containing a plurality of misting nozzles (not shown). Water, represented by an arrow 38, enters system 20 via input hose 34 and exits system 20 as pressurized water, represented by an arrow 40, via output hose 36.

A power switch 42 and a power cord 44, in electrical communication with power switch 42, extend through rear panel 26. When power switch 42 is switched to an "On" position, AC power is enabled to a motor (discussed below) of system 20 so that a water pump (discussed below) is activated. When the water pump is activated, system 20 discharges pressurized water 40.

Feet 46 are coupled to a base 48 of housing 22. Feet 46 maintain system 20 above a surface on which system 20 may be sitting to hold system 20 out of possible precipitation pooled beneath system 20. Housing 22 is a rugged container manufactured from painted, galvanized steel.

Figure 2:
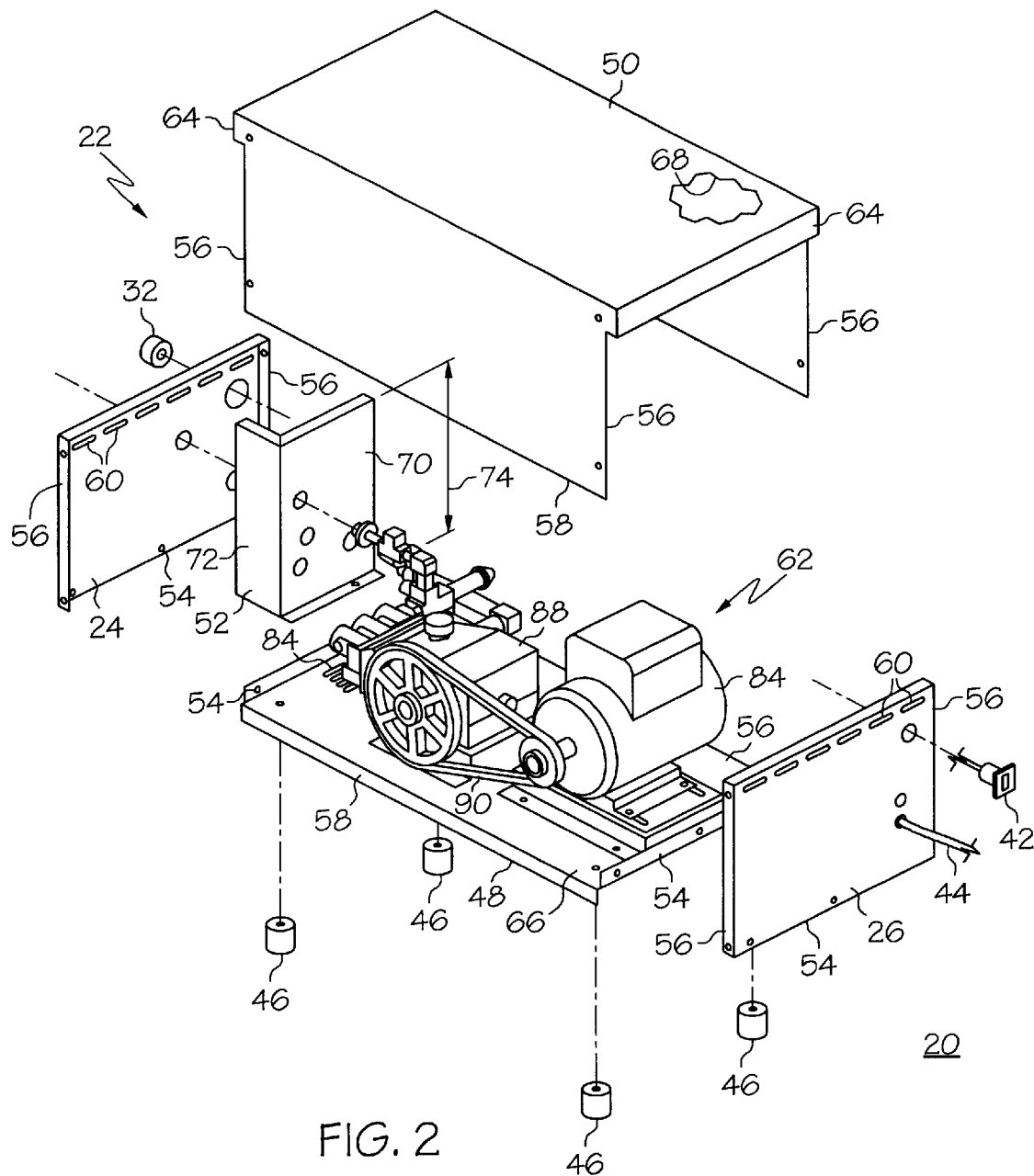
FIG. 2 shows an exploded view of the misting pump system.

FIG. 2 shows an exploded view of misting pump system 20. Along with front panel 24, rear panel 26, and base 48, housing 22 also includes a cover 50 and a barrier wall 52. Front and rear panels 24 and 26, respectively, extend from and are arranged substantially perpendicular to base 48. In addition, panels 24 and 26 are removably coupled to base 48 along corresponding lower edges 54 using fasteners, for example, screws. Cover 50 is removably coupled to front and rear panels 24 and 26 along corresponding side edges 56. In addition, cover 50 may be removably coupled to base 48 along corresponding lower side edges 58. Housing 22 is readily assembled and dissembled for easy access to the internal mechanisms (discussed below) within housing 22.

Front and rear panels 24 and 26 include apertures 60 for providing cooling air to an electronic section 62 of system 20. Awnings 64 are integrally formed in cover 50 for ease and economy of manufacture. Awnings 64 overhang apertures 60 when cover 50 is coupled to base 48 and front and rear panels 24 and 26, respectively. Awnings 64 allow free airflow through apertures 60 but shield apertures 60 from entry of precipitation. Although apertures 60 are shown in both of front and rear panels 24 and 26, it should be readily apparent that apertures 60 may be located in only one of front and rear panels 24 and 26. As such, only one of awnings 64 may be formed in cover 50 to shield apertures 60 located in the one of front and rear panels 24 and 26.

Barrier wall 52 extends from a floor 66 of base 48 to an inside surface, or roof 68, of cover 50 when cover 50 is coupled to base 48 and front and rear panels 24 and 26, respectively. Barrier wall 52 includes a first side wall 70 and a second side wall 72 arranged substantially perpendicular to first side wall 70. First and second side walls 70 and 72, respectively, are each arranged substantially perpendicular to and couple to floor 66 of base 48.

Figure 3:
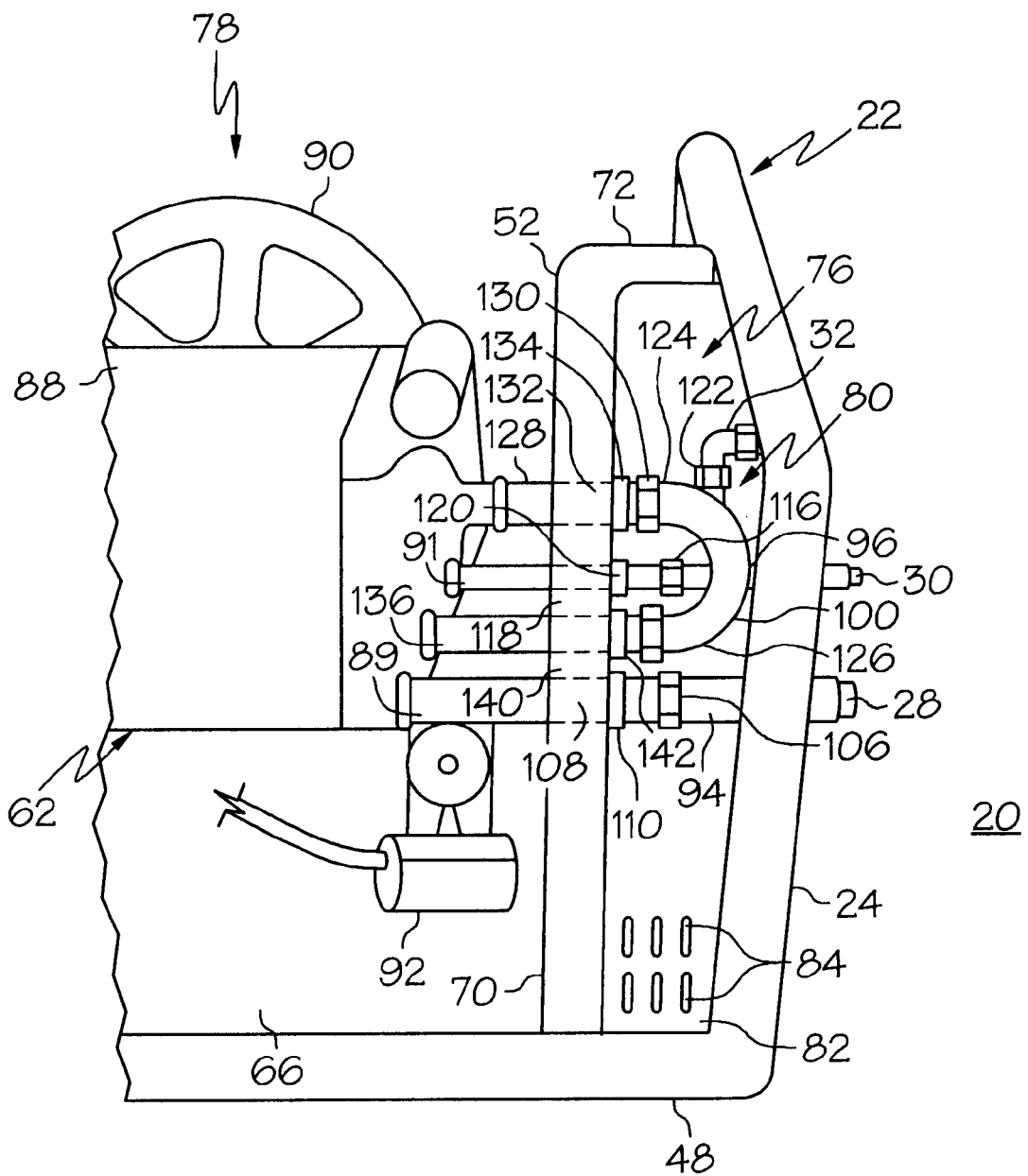
FIG. 3 shows a perspective view a portion of the misting pump system.

Referring to FIG. 3 in connection with FIG. 2, FIG. 3 shows a perspective view a portion of misting pump system 20. First and second side walls 70 and 72 extend a height 74 above floor 66 to contact roof 68 when cover 50 is in place over base 48. As such, barrier wall 52 forms a first compartment 76 and a second compartment 78 within housing 22. A water transfer section 80 of system 20 is located in first compartment 76 and electronic section 62 is located in second compartment 78.

First and second side walls 70 and 72 of barrier wall 52 are configured to substantially prevent passage of water from first compartment 76 to second compartment 78 in the event of a water leak from water transfer section 80. In addition, a section 82 of base 48 forms a floor portion of first compartment 76. Openings 84 advantageously extend through section 82 to provide a drain for first compartment 76 in the event of a water leak from water transfer section 80.

Electronic section 62, located in second compartment 78, generally includes switch 42, a motor 86, and a water pump 88 in communication with motor 86 via a pulley 90. Switch 42 extends through rear panel 26 into second compartment 78 and is in electrical communication with motor 86 for enabling power to motor 86. Water pump 88 is a pulley-driven pressure boosting pump controlled by motor 86 for boosting a water pressure of water 38 (FIG. 1) to provide pressurized water 40 (FIG. 1). In a preferred embodiment, water 38 exhibits a pressure of fifty to sixty pounds per square inch. Pump 88 is configured to provide pressurized water 40 at a greater pressure, for example, approximately one thousand pounds per square inch.

Water pump 88 includes an inlet 89 and an outlet 91. A solenoid valve 92 of electronic section 62 is positioned in second compartment 78. Solenoid valve 92 is in communication with inlet 89 for controlling a flow of water 38 (FIG. 1) into water pump 88. Solenoid valve 92 is electrically coupled with switch 42 and is enabled when switch 42 is turned "on".

Figure 4:
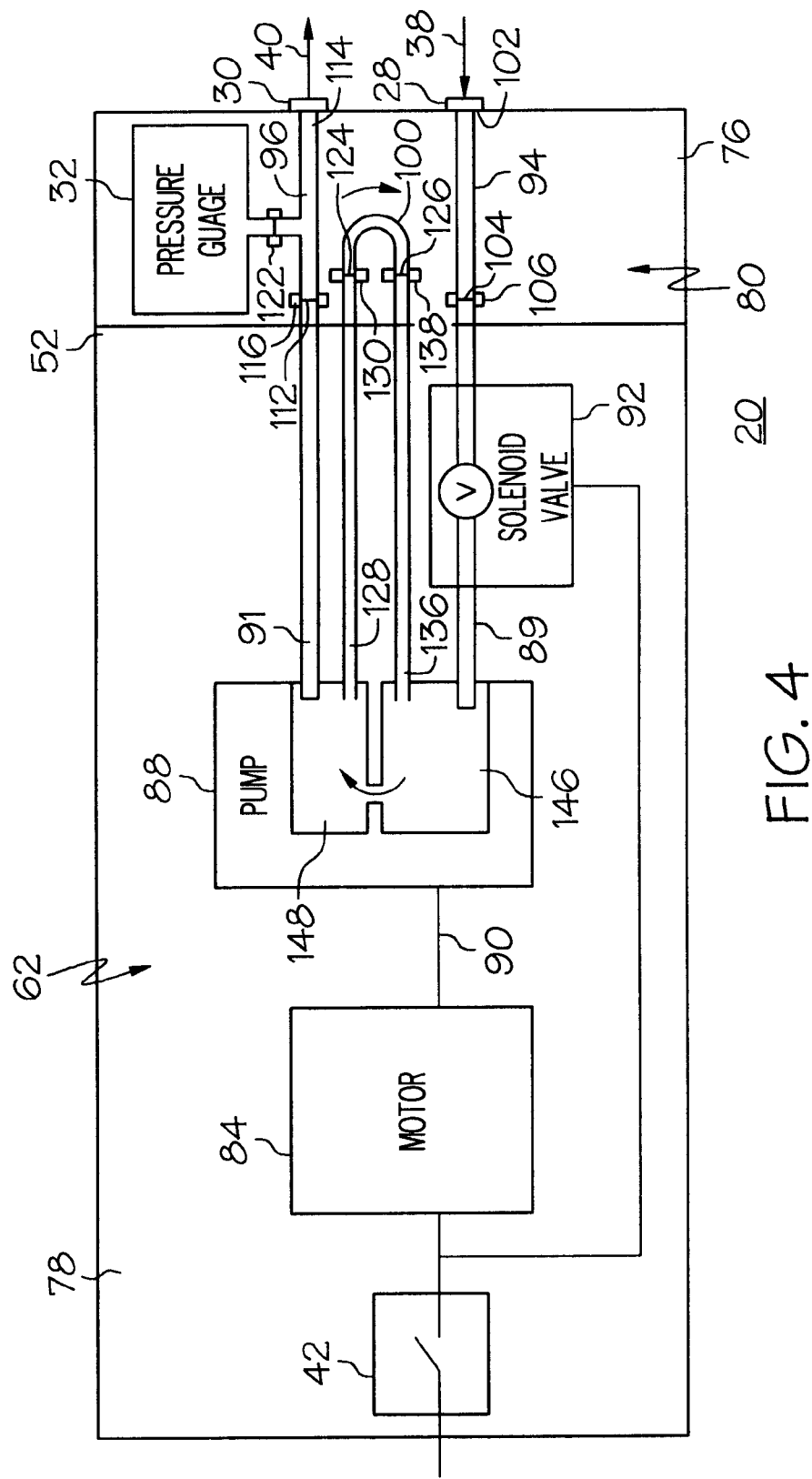
FIG. 4 shows a block diagram of the misting pump system.

Referring to FIGS. 3 and 4, FIG. 4 shows a block diagram of misting pump system 20. Water transfer section 80, located in first compartment 76, generally includes an inlet tube 94, an outlet tube 96, pressure gauge 32, and a bypass tube 100. Inlet tube 94 has a first end 102 coupled to inlet port 28 and a second end 104 in fluid communication with inlet 89 of pump 88 via solenoid valve 92. A coupling 106 is used to connect second end 104 to an input of solenoid valve 92. The input of solenoid valve 92 extends through a first opening 108 in first side wall 70 so that coupling 106 may be located in first compartment 76. A grommet 110 is located about the input of solenoid valve within first opening 108. Grommet 110 forms a water resistant seal between first and second compartments 76 and 78, respectively. Inlet tube 94 is configured to receive water 38 from hose 34 (FIG. 1) and deliver water 38 through solenoid 92 to inlet 89 of pump 88.

Outlet tube 96 has a first end 112 in fluid communication with outlet 91 of water pump 88 and a second end 114 connected to outlet port 30. A coupling 116 is used to connect first end 112 to outlet 91 of water pump 88. Outlet 91 extends through a second opening 118 in first side wall 70 so that coupling 116 may be located in first compartment 76. A grommet 120 is located about outlet 91 within second opening 118. Grommet 120 forms a water resistant seal between first and second compartments 76 and 78, respectively. Outlet tube 96 is configured to receive pressurized water 40 (FIG. 1) from pump 84 and discharge pressurized water 40 from outlet port 30.

Pressure gauge 32, positioned in first compartment 76, is connected to outlet tube 96 via a coupling 122. Pressure gauge 32 is in fluid communication with outlet tube 96 for monitoring the water pressure of pressurized water 40 (FIG. 1). The water pressure is displayed on a display or analog meter of pressure gauge 32 (FIGS. 1–2) external to housing 22.

Bypass tube 100 has a first end 124 in fluid communication with outlet 91 of pump 88 and a second end 126 in fluid communication with inlet 89 of pump 88. First end 124 is connected to a second outlet 128 of pump 88 via a coupling 130. Second outlet 128 extends through a third opening 132 in first side wall 70 so that coupling 130 is located in first compartment 76. A grommet 134 is located about second outlet 128 within third opening 132. Grommet 134 forms a water resistant seal between first and second compartments 76 and 78, respectively.

Likewise, second end 126 is connected to a second inlet 136 of pump 88 via a coupling 138. Second inlet 136 extends through a fourth opening 140 in first side wall 70 so that coupling 138 is located in first compartment 76. A grommet 142 is located about second inlet 136 within fourth opening 140. Grommet 142 forms a water resistant seal between first and second compartments 76 and 78, respectively.

Bypass tube 100 is configured to circulate a second, or unused, portion of pressurized water, represented by an arrow 144, received from second outlet 128 to second inlet 136. In other words, unused water 144 is that portion of pressurized water 40 that is not being consumed, or output, at outlet port 30. Accordingly, bypass tube 100 improves the efficiency of system 20 by allowing any unused water to be replaced back into the system.

In a preferred embodiment, inlet and outlet tubes 94 and 96, respectively, are formed from a substantially rigid material, such as brass or copper. However, for space economy in first compartment 76, bypass tube 100 is a flexible hose. Inlet and outlet tubes 94 and 96, respectively, and bypass tube 100 are advantageously located in first compartment 76 so that should any of tubes 94, 96, or 100 become cracked or otherwise fail, leaking water will leak into first compartment 76 but not into second compartment 78. Likewise, couplings 106, 116, 122, 130, and 138 are located in first compartment 76 so that should a coupling crack or otherwise fail, leaking water will leak into first compartment 76 but not into second compartment 78.

Grommets 110, 120, 134, and 142 substantially prevent the leaking water from crossing first. side wall 70 of barrier wall 52 through openings 108, 118, 132, and 140 into second compartment 78. In addition, openings 84 in section 82 of floor 66 provide a path for the leaking water to drain out of first compartment 76.

Thus, when switch 42 is closed, motor 84 and solenoid valve 92 are activated. A shaft of motor 84 turns thereby turning pulley 90 in order to activate pump 88. Water 38 travels into inlet tube 94 through solenoid valve 92 and into an inlet chamber 146 of pump 88 via inlet 89. Water 38 is pumped into an outlet chamber 148 of pump 88 and expelled through outlet 91 to outlet tube 96. Pressurized water 40 is subsequently discharged from outlet port 30. Unused water 144 exits outlet chamber 148 through second outlet 128 and is circulated through bypass tube 100 back into inlet chamber 146 through second inlet 136.

In summary, the present invention teaches of an improved misting pump system. A barrier wall of the system housing establishes a first compartment for housing a water transfer section of the misting pump system and a second compartment for housing an electronic section of the misting pump system. The separate compartments serve to substantially prevent damage to the electronic section as a result of a water leak from the water transfer section. The housing includes vents for providing cooling airflow and awnings integral to the cover which shield the vents from entry of precipitation. The resulting misting pump system and housing is water resistant, rugged, and readily assembled.

Although the preferred embodiments of the invention have been illustrated and described in detail, it will be readily apparent to those skilled in the art that various modifications may be made therein without departing from the spirit of the invention or from the scope of the appended claims. For example, there are a number of styles of motors and pumps that may be selected and different materials may be utilized for the tubes of the water transfer section as long as separation is maintained between the electronic section and the water transfer section of the system.

What is claimed is:

1. A housing for a misting pump system comprising:
   a base having a floor;
   a cover removably coupled to said base, said cover having a roof; and
   a barrier wall coupled to said floor of said base, said barrier wall extending from said floor to said roof to form first and second compartments within said housing, a section of said base forms a floor portion of said first compartment, and openings extend through said section, and said first compartment is configured to house a water transfer section of said system, and said second compartment is configured to house an electronic section of said system.

2. A misting pump system comprising:
   a motor;
   a water pump in communication with and controlled by said motor;
   a first tube in fluid communication with an inlet of said water pump for delivering water to said water pump, said water exhibiting a first water pressure;
   a second tube in fluid communication with an outlet of said water pump for receiving pressurized water from said water pump, said pressurized water exhibiting a second water pressure that is greater than said first water pressure;
   a housing including:
      a base having a floor;
      a cover removably coupled to said base, said cover having a roof;
      a barrier wall coupled to said floor of said base, said barrier wall extending from said floor to said roof to form first and second compartments within said housing, said first and second tubes being located in said first compartment and said motor and said water pump being located in said second compartment; and
      a rear panel coupled to said base; and
      a switch in electrical communication with said motor for enabling power to said motor, said switch extending through said rear panel into said second compartment.

3. A misting pump system comprising:
   a motor;
   a water pump in communication with and controlled by said motor;
   a first tube in fluid communication with an inlet of said water pump for delivering water to said water pump, said water exhibiting a first water pressure;
   a second tube in fluid communication with an outlet of said water pump for receiving pressurized water from said water pump, said pressurized water exhibiting a second water pressure that is greater than said first water pressure;
   a housing including:
      a base having a floor;
      a cover removably coupled to said base, said cover having a roof; and
      a barrier wall coupled to said floor of said base, said barrier wall extending from said floor to said roof to form first and second compartments within said housing, said first and second tubes being located in said first compartment and said motor and said water pump being located in said second compartment; and
   a solenoid valve positioned in said second compartment and coupled between said first tube and said inlet of said water pump, said solenoid valve being configured to control a flow of said water between said first tube and said water pump.

4. A misting pump system comprising:
   a motor;
   a water pump in communication with and controlled by said motor;
   a first tube in fluid communication with an inlet of said water pump for delivering water to said water pump, said water exhibiting a first water pressure;
   a second tube in fluid communication with an outlet of said water pump for receiving pressurized water from said water pump, said pressurized water exhibiting a second water pressure that is greater than said first water pressure;
   a housing including:
      a base having a floor;
      a cover removably coupled to said base, said cover having a roof; and
      a barrier wall coupled to said floor of said base, said barrier wall extending from said floor to said roof to form first and second compartments within said housing, said first and second tubes being located in said first compartment and said motor and said water pump being located in said second compartment; and a pressure gauge positioned in said first compartment and in communication with said second tube for monitoring said second water pressure.

5. A misting pump system comprising:

a motor;

a water pump in communication with and controlled by said motor;

a first tube in fluid communication with an inlet of said water pump for delivering water to said water pump, said water exhibiting a first water pressure;

a second tube in fluid communication with an outlet of said water pump for receiving pressurized water from said water pump, said pressurized water exhibiting a second water pressure that is greater than said first water pressure, said second tube including and outlet port;

a housing including:
 a base having a floor;
 a cover removably coupled to said base, said cover having a roof; and
 a barrier wall coupled to said floor of said base, said barrier wall extending from said floor to said roof to form first and second compartments within said housing, said first and second tubes being located in said first compartment and said motor and said water pump being located in said second compartment, wherein said outlet port of said second tube extends from said housing for discharging a first portion of said pressurized water from said system; and a bypass tube located in said first compartment, said bypass tube having a first end in fluid communication with said outlet of said pump and a second end in fluid communication with said inlet of said pump, said bypass tube being configured to circulate a second portion of said pressurized water received from said outlet to said inlet.

6. A misting pump system comprising:

a motor;

a water pump in communication with and controlled by said motor;

a first tube in fluid communication with an inlet of said water pump for delivering water to said water pump, said water exhibiting a first water pressure;

a second tube in fluid communication with an outlet of said water pump for receiving pressurized water from said water pump, said pressurized water exhibiting a second water pressure that is greater than said first water pressure; and a housing including:
 a base having a floor;
 a cover removably coupled to said base, said cover having a roof; and
 a barrier wall coupled to said floor of said base, said barrier wall extending from said floor to said roof to form first and second compartments within said housing, said first and second tubes being located in said first compartment and said motor and said water pump being located in said second compartment;
 a front panel coupled to said base and said cover;
 a rear panel coupled to said base and said cover, at least one of said front and rear panels having apertures extending therethrough; and
 an awning extending from said cover, said awning being configured to shield said apertures from entry of precipitation when said cover is coupled to said base.

7. A misting pump system comprising:

a motor;

a water pump in communication with and controlled by said motor;

a first tube in fluid communication with an inlet of said water pump for delivering water to said water pump, said water exhibiting a first water pressure;

a second tube in fluid communication with an outlet of said water pump for receiving pressurized water from said water pump, said pressurized water exhibiting a second water pressure that is greater than said first water pressure; and a housing including:
 a base having a floor;
 a cover removably coupled to said base, said cover having a roof; and
 a barrier wall coupled to said floor of said base, said barrier wall extending from said floor to said roof to form first and second compartments within said housing, a section of said base forms a floor portion of said first compartment, openings extend through said section of said base, said first and second tubes are located in said first compartment, and said motor and said water pump are located in said second compartment.

8. A misting pump system comprising:

a motor;

a water pump in communication with and controlled by said motor;

a first tube in fluid communication with an inlet of said water pump for delivering water to said water pump, said water exhibiting a first water pressure;

a second tube in fluid communication with an outlet of said water pump for receiving pressurized water from said water pump, said pressurized water exhibiting a second water pressure that is greater than said first water pressure; and a housing including:
 a base having a floor;
 a cover removably coupled to said base, said cover having a roof; and
 a barrier wall coupled to said floor of said base, said barrier wall extending from said floor to said roof to form first and second compartments within said housing, said first and second tubes being located in said first compartment and said motor and said water pump being located in said second compartment, and said barrier wall includes:
  a first opening configured to allow fluid communication between said inlet of said water pump and said first tube, wherein a connection junction is located in said first compartment;
  a second opening configured to allow passage of said outlet of said water pump into said first compartment, said second tube coupling to said outlet in said first compartment; and
  grommets positioned in each of said first and second openings for forming a water resistant seal between said first and second compartments.

9. A housing for a misting pump system comprising:

a base having a floor;

a panel coupled to an edge of said base, said panel including apertures extending through said panel;

a cover removably coupled to said base, said cover having a roof, and said cover including an awning configured to shield said apertures from entry of precipitation when said cover is coupled to said base; and a barrier wall coupled to said floor of said base, said barrier wall extending from said floor to said roof to form first and second compartments within said housing, said first compartment being configured to house a water transfer section of said system, and said second compartment being configured to house an electronic section of said system.

10. A housing as claimed in claim 9 wherein said awning is integrally formed in said cover.

11. A housing for a misting pump system comprising:

a base having a floor;

a cover removably coupled to said base, said cover having a roof; and a barrier wall coupled to said floor of said base, said barrier wall extending from said floor to said roof to form first and second compartments within said housing, said first compartment being configured to house a water transfer section of said system, said second compartment being configured to house an electronic section of said system, and said barrier wall including:

a first side wall arranged substantially perpendicular to and extending a height above said floor of said base; and a second side wall arranged substantially perpendicular to said first side wall and extending said height above said floor, said first and second side walls isolating said first compartment from said second compartment.

12. A housing as claimed in claim 11 wherein said housing further comprises a front panel coupled to said base and extending said height above said floor, said second side wall being further coupled to said front panel.

13. A housing for a misting pump system, said misting pump system including a water transfer section and an electronic section, wherein a tube of said water transfer section is in fluid communication with a water pump of said electronic section, said housing comprising:

a base having a floor;

a cover removably coupled to said base, said cover having a roof;

a barrier wall coupled to said floor of said base, said barrier wall extending from said floor to said roof to form first and second compartments within said housing, said first compartment being configured to house said water transfer section, said second compartment being configured to house said electronic section, and said barrier wall including an opening extending therethrough, said opening being configured to allow passage of a water port of said pump into said first compartment for attachment to said water tube; and a grommet for positioning about said water port in said opening to form a water resistant seal between said first and second compartments.

14. A misting pump system comprising:

a motor;

a water pump in communication with and controlled by said motor;

an inlet tube in fluid communication with an inlet of said water pump for delivering water to said water pump, said water exhibiting a first water pressure;

an outlet tube in fluid communication with an outlet of said water pump for receiving pressurized water from said water pump, said pressurized water exhibiting a second water pressure that is greater than said first water pressure, said inlet and outlet tubes being formed from a substantially rigid material; and a housing including:

a base having a floor;

a front panel coupled to a front edge of said base;

a rear panel coupled to a rear edge of said base, at least one of said front and rear panels having apertures extending therethrough;

a cover removably coupled to said base, said cover having a roof;

an awning integrally formed in said cover, said awning being configured to shield said apertures from entry of precipitation when said cover is coupled to said base; and a barrier wall coupled to said floor of said base and to said front panel, said barrier wall extending from said floor to said roof to form first and second compartments within said housing, said first compartment being configured to house said inlet and outlet tubes and said second compartment being configured to house said motor and said pump.

15. A misting pump system as claimed in claim 14 wherein said barrier wall is configured to substantially prevent passage of leaking water from said first compartment into said second compartment, said leaking water issuing from a water leak in one of said inlet and outlet tubes.

16. A misting pump system as claimed in claim 14 wherein:

said outlet tube includes an outlet port extending from said housing for discharging a first portion of said pressurized water from said system; and said system further comprises a bypass tube located in said first compartment, said bypass tube having a first end in fluid communication with said outlet of said pump and a second end in fluid communication with said inlet of said pump, said bypass tube being configured to receive a second portion of said pressurized water from said outlet and circulate said second portion to said inlet.

* * * * *